US007558958B2

(12) United States Patent
Lieberman et al.

(10) Patent No.: US 7,558,958 B2
(45) Date of Patent: Jul. 7, 2009

(54) SYSTEM AND METHOD FOR SECURELY BOOTING FROM A NETWORK

(75) Inventors: Bruce L. Lieberman, Bellevue, WA (US); Jeffrey A. Davis, Snohomish, WA (US); Alan R. Steiner, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 2120 days.

(21) Appl. No.: 10/170,975

(22) Filed: Jun. 13, 2002

(65) Prior Publication Data
US 2003/0233558 A1    Dec. 18, 2003

(51) Int. Cl.
G06F 12/14        (2006.01)
(52) U.S. Cl. .............................. 713/176; 713/1; 713/2; 713/164; 726/2; 726/16; 726/17
(58) Field of Classification Search ............... 713/1, 713/2, 100, 164, 176, 193, 300, 150, 716; 709/220–222; 463/29; 714/36; 711/1, 6; 717/100, 171, 176; 726/1, 2–4, 16–17
See application file for complete search history.

(56) References Cited

U.S. PATENT DOCUMENTS

| 5,522,076 | A | * | 5/1996 | Dewa et al. ..................... 713/2 |
| 5,666,293 | A |   | 9/1997 | Metz et al. |
| 5,842,011 | A |   | 11/1998 | Basu |
| 5,974,547 | A |   | 10/1999 | Klimenko |
| 5,978,912 | A | * | 11/1999 | Rakavy et al. .................. 713/2 |
| 6,185,678 | B1 |  | 2/2001 | Arbaugh et al. |
| 6,189,100 | B1 |  | 2/2001 | Barr et al. |
| 6,263,431 | B1 | * | 7/2001 | Lovelace et al. ............... 713/2 |
| 6,272,629 | B1 |  | 8/2001 | Stewart |
| 6,317,826 | B1 |  | 11/2001 | McCall et al. |
| 6,327,652 | B1 |  | 12/2001 | England et al. |
| 6,330,670 | B1 |  | 12/2001 | England et al. |
| 6,367,009 | B1 | * | 4/2002 | Davis et al. .................. 713/166 |
| 6,381,741 | B1 |  | 4/2002 | Shaw |
| 6,405,309 | B1 | * | 6/2002 | Cheng et al. .................... 713/1 |
| 6,463,535 | B1 | * | 10/2002 | Drews ......................... 713/176 |
| 6,564,326 | B2 | * | 5/2003 | Helbig, Sr. .................... 726/34 |

(Continued)

OTHER PUBLICATIONS

White, Ron; "How Coputers Work: Millennium Edition"; Published Sep. 1999; p. 9 and 16-25.*

Primary Examiner—Kambiz Zand
Assistant Examiner—Yin-Chen Shaw
(74) Attorney, Agent, or Firm—Lee & Hayes, PLLC

(57) ABSTRACT

A consumer device is presented that utilizes a system and method for downloading from a network server the run time image of the device's operating system and/or application program. As such, the amount of Flash memory required to store the operating system may be greatly reduced, which also reduces the cost associated with such Flash memory. Since the run time image is downloaded from a network server, the image can be updated at the server for bug fixes and feature enhancements. For devices operating in audio/video distribution, additional security is provided to maintain the digital rights management of the A/V content. This security is provided through a combination of hardware and software security features including ROM in the CPU or board mounted Flash memory with an unwritable section. Further, each boot load program checks the digital signature of the program it is loading before that program is allowed to execute.

18 Claims, 9 Drawing Sheets

U.S. PATENT DOCUMENTS

| | | | |
|---|---|---|---|
| 6,748,525 B1 * | 6/2004 | Hubacher et al. | 713/1 |
| 6,807,643 B2 * | 10/2004 | Eckardt et al. | 714/36 |
| 6,839,836 B2 * | 1/2005 | Cole et al. | 713/2 |
| 6,948,094 B2 * | 9/2005 | Schultz et al. | 714/15 |
| 6,978,018 B2 * | 12/2005 | Zimmer | 380/30 |
| 2001/0054161 A1 * | 12/2001 | Woodruff | 714/27 |
| 2002/0133702 A1 * | 9/2002 | Stevens | 713/163 |
| 2003/0018892 A1 * | 1/2003 | Tello | 713/164 |
| 2003/0188176 A1 * | 10/2003 | Abbondanzio et al. | 713/191 |

* cited by examiner

SYSTEM AND METHOD FOR SECURELY BOOTING FROM A NETWORK

FIELD OF THE INVENTION

This invention relates generally to systems and methods for booting networked devices, and more particularly, relates to systems and methods for securely booting networked devices wherein the operating system is downloaded to the device from the network during the boot operation.

BACKGROUND OF THE INVENTION

Current computing devices typically store their operating system locally within the device. This operating system run time image is typically stored, either raw or compressed, in a slower read-only memory (ROM) memory such as Flash ROM. This image is then loaded from the Flash memory (and uncompressed if necessary) to local random access memory (RAM), which provides much better performance during the operation of the device. This general operating architecture, however, presents a significant drawback to next generation consumer computing devices as they are being developed.

Specifically, many of these next generation consumer computing devices are typically small, compact devices that provide specific limited functionality at a significantly reduced cost that consumers can afford. Recognizing that such devices do not require all of the functionality provided by the operating system of a typical home computer, "abbreviated" operating systems, such as the Windows CE brand operating system provided by the Assignee of the instant application, have been developed for usage in such devices. While the amount of memory required by such operating systems is greatly reduced compared to their full-blown cousins, it is not uncommon for such operating systems to require approximately thirty megabytes of storage space. Unfortunately, the cost of the flash memory in which the operating system image is stored is quite expensive. It is not uncommon for such Flash memory to add $35 to $40 to the cost of the consumer device, simply to store the operating system image. This cost is unacceptable for such consumer devices.

For networked devices, various systems and methods are known for downloading the operating system image from the network. Systems and methods that employ this remote boot technology typically conform either to the Wired for Management (WfM) specifications or the Pre-Boot Execution Environment (PXE), Remote Program Load (RPL), Boot Strap Protocol (BOOTP), etc. protocols. Other systems such as Etherboot, which creates ROM images that can download code over an Ethernet network to be executed on an x86 computer, are compliant with the open source, Multiboot specification. Such systems and methods can reduce or eliminate the reliance on booting from solid-state devices, such as Flash memory, and can allow for the centralizing of software administration. This latter benefit ensures that updates, bug fixes, security patches, etc., are utilized by the devices at each boot.

While such network booting systems and methods allow a computing device to download the operating system from the network, which would thereby reduce the amount of flash memory required by the device, such current systems are inappropriate for certain types of consumer computing devices that require a high level of security. For example, consumer computing devices developed to play audio/video content, for example, Hollywood movies, must have very high levels of security to prevent unauthorized hacker programs from being run on them that could potentially allow the cracking of the encryption used to secure the A/V content. If such hacker programs could be run on such consumer computing devices, than there is a serious threat of the audio/video content being stolen and made available without the security mechanisms (encryption) via the Internet, pirated DVDs and VHS cassettes, etc. In view of the serious threat to the audio/video industry of such loss of content protection, consumer computing devices capable of playing such A/V content cannot utilize such network boot-loader programs, and must instead continue to rely on the secure storage of the operating system image in secured Flash memory.

There exists, therefore, a need in the art for a network boot system and method that can maintain the levels of security required to ensure the maintenance of digital rights management for A/V content to prevent unauthorized hacking of the content protection mechanisms and to reduce the cost component of the consumer computing device attributable to the amount of Flash memory required.

BRIEF SUMMARY OF THE INVENTION

In view of the above, the system and method of the present invention provides networked consumer computing devices, and in particular devices used for audio/video (A/V) distribution that have an associated server on a network, a way to reduce the amount of Flash memory needed to store the operating system locally in the device. Instead of storing the operating system in local Flash memory, the consumer computing device interrogates the network for a compatible server and downloads the run time operating system image to the device. In this way, the cost of the device may be reduced because the amount of Flash memory can be reduced to an amount just sufficient to hold a boot loader program.

To satisfy the requirements of the A/V content providers, and because the operating system image is not stored locally in the device, the system and method of the present invention include programs and steps designed to provide security and copy protection. In one embodiment, the operating system image is encrypted and protected using Digital Rights Management (DRM) technology. Since the image is downloaded to the consumer computing device from a server, maintenance of the operating system can be centralized with an administrator so that the version of the operating system downloaded at boot is always an updated version including all of the released bug fixes, security patches, and feature enhancements. Since typical servers run twenty four hours a day, seven days a week, whereas consumer computing devices are typically shut off periodically, this update can happen transparently to the user, or may be configured to operate with user interaction, as desired.

For embodiments of the present invention utilized with networked consumer computing devices used for audio/video distribution that have a server on the network and which load their images from this server, the present invention provides a series of boot programs that run on the device to eventually obtain the A/V player program run time image (operating system run time image). To maintain the required level of security for the A/V content, one embodiment of the present invention utilizes security-in-the-chip manufacturing techniques. Each embodiment, however, utilizes boot programs that validate the program that it is booting.

That is, for an embodiment that includes ROM memory in the central processing unit (CPU), a CPU boot loader program (CPL) is stored therein and cannot be changed. For embodiments that do not have ROM in the CPU, chip-on-board manufacturing is used together with Flash memory that provides an unwritable section. If the CPU contains a CPU program loader (CPL) in on board ROM, that program checks the digital signature of and executes an initial program loader (IPL) stored in the unwritable section of the board-mounted Flash memory. In the absence of ROM in the CPU, there will be no CPL to validate the IPL in Flash memory. Instead, the system of the present invention relies on the board-mounted flash manufacturing process to ensure the integrity of the flash chip and the IPL that is resident in the unwritable section thereof. This IPL in the Flash memory will then execute a boot program loader (BPL) also stored in the unwritable section of the board-mounted Flash memory. This BPL will check the signature of and execute a network program loader (NPL). This NPL will then load the audio/video operating system program image over the network from the server and check the digital signature of that image before executing the A/V program.

Through the use of the system and methods of the present invention, the security of the consumer computing device is greatly enhanced. For such devices that will be used to render A/V content, proprietary algorithms for A/V codecs will be resident in the consumer device. By implementing the dynamic, volatile solution presented by the system and methods of the present invention, the risk of hackers making illegal copies of the ROM or the A/V content to be proliferated is greatly reduced. This security is further enhanced by keeping the image encrypted and secure until it is decrypted at run time within the device, which greatly reduces the chances of the image being copied by such hackers.

In one embodiment of the present invention a method of booting a consumer computing device having non-rewritable memory, writable non-volatile memory, and random access memory (RAM) via a network server is presented. This method comprises the steps of executing an initial program loader (IPL) stored in the non-rewritable memory within the device. This IPL decompresses a boot program loader (BPL) from the non-rewritable memory and stores the decompressed BPL in RAM. The method executes the BPL, which validating a signature of a network program loader (NPL) stored in the writable non-volatile memory. The BPL further decompresses the NPL when the signature can be validated and stores the decompressed NPL in RAM. The method further executes the NPL to initialize a network connection from the device to the network server. This NPL then downloads a run time image of an operating system from the network server, and validates a signature of the operating system. The operating system is then executed when its signature can be validated.

In an embodiment where the device includes a central processing unit (CPU) having read only memory (CPU ROM) provided therein, the method further comprises the step of executing a central processing unit program loader (CPL) stored in the CPU ROM prior to the step of executing the IPL. This CPL calculates a secure hash of the non-rewritable memory and compares it to a hard coded value stored in the CPU ROM. The CPL executes the IPL when the secure hash matches the hard coded value, and stalls operation of the device when the secure hash does not match the hard coded value. In a further embodiment, the IPL performs basic memory tests prior to the step of decompressing the BPL. The IPL displays an error and re-boots the device upon detecting a memory error.

In a further embodiment of the present invention, the BPL performs diagnostic tests on the device prior to the step of validating the signature of the NPL. The BPL displays an error and re-boots the device upon failure of one of these diagnostic tests. The BPL further checks a failsafe override input. When selected the BPL uncompresses a failsafe program stored in the writable non-volatile memory into RAM and executes it. This failsafe program retrieves a new NPL from the network server, stores the new NPL in the writable non-volatile memory, and reboots the device. In an embodiment of the invention, the BPL uncompresses the failsafe program stored in the writable non-volatile memory into RAM when the signature of the NPL cannot be validated. This failsafe program is the executed. During this execution, the failsafe program retrieves a new NPL from the network server, stores the new NPL in the writable non-volatile memory, and reboots the device. The NPL further performs network tests to determine the status of the network, and displays an error and reboots the device when a network test fails.

In yet a further embodiment of the present invention, the operating system provides a plurality of services. The operating system records an event file to the writable non-volatile memory upon user selection of an event history service. The operating system further reboots the device upon user selection of a reboot service. In a further service, the operating system downloads a new version of the operating system into a buffer, validates a signature of the new version of the operating system, uncompresses the new version of the operating system into RAM, and executes the new version of the operating system upon user selection of a new version service. Preferably, the operating system displays an error and reboots the device when this signature cannot be validated. The operating system downloads a new version of the NPL, validates a signature of the new version of the NPL, and burns the new version of the NPL into the writable non-volatile memory when the fourth signature is validated upon user selection of a new NPL service. Preferably, the operating system displays an error and reboots the device when this signature cannot be validated. Finally, the operating system downloads a new version of a local only program (LOP), validates its signature, and burns the LOP into the writable non-volatile memory when the signature is validated upon user selection of the new LOP service. Preferably, the operating system displays an error and reboots the device when this signature cannot be validated.

In an alternate embodiment of the present invention, a computer-readable medium having stored thereon computer-executable instructions for performing the steps of executing an initial program loader (IPL) stored in the non-rewritable memory within the device. This IPL decompresses a boot program loader (BPL) from the non-rewritable memory and stores the decompressed BPL in RAM. The method executes the BPL, which validating a signature of a network program loader (NPL) stored in the writable non-volatile memory. The BPL further decompresses the NPL when the signature can be validated and stores the decompressed NPL in RAM. The method further executes the NPL to initialize a network connection from the device to the network server. This NPL then downloads a run time image of an operating system from the network server, and validates a signature of the operating system. The operating system is then executed when its signature can be validated.

In yet a further embodiment, a method of securely booting a device via a network is presented. This method comprises the steps of employing a first hardware security policy in the storage of an initial program loader (IPL) and a boot program loader (BPL), and employing a first software security policy in an extraction and execution of a network program loader (NPL), and in the downloading and execution of a run time image of an operating system. Preferably, the method further comprising the steps of employing a second hardware security policy in a storage of a central processing unit program loader (CPL), and employing a second software security policy in the storage of the IPL and the BPL. In one embodiment, the step of employing the second hardware security policy comprises the steps of providing a central processing unit (CPU) with read only memory (ROM) with the CPL being stored in the CPU ROM. In this embodiment the step of employing the second software security policy comprises the steps of calculating a secure hash of a memory element in which the IPL and the BPL are stored and comparing the secure hash with a hard coded value in the CPU ROM. The CPL stalls the CPU when the secure hash does not match the hard coded value.

In a further embodiment the step of employing the first hardware security policy comprises the steps of providing a non-writable memory element in which the IPL and the BPL are to be stored, and installing the non-writable memory element on-board having all connections between a central processing unit (CPU) and the non-writable memory element existing in sub-layers of a multi-layer circuit board. Preferably, the step of employing the first software security policy comprises the steps of validating a first signature of the NPL before uncompressing the NPL for execution, and validating a second signature of the operating system downloaded from the network prior to executing the operating system. In this embodiment the step of employing the first software security policy further comprises the steps of displaying an error and rebooting the device when any one of the first and the second signatures cannot be validated.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
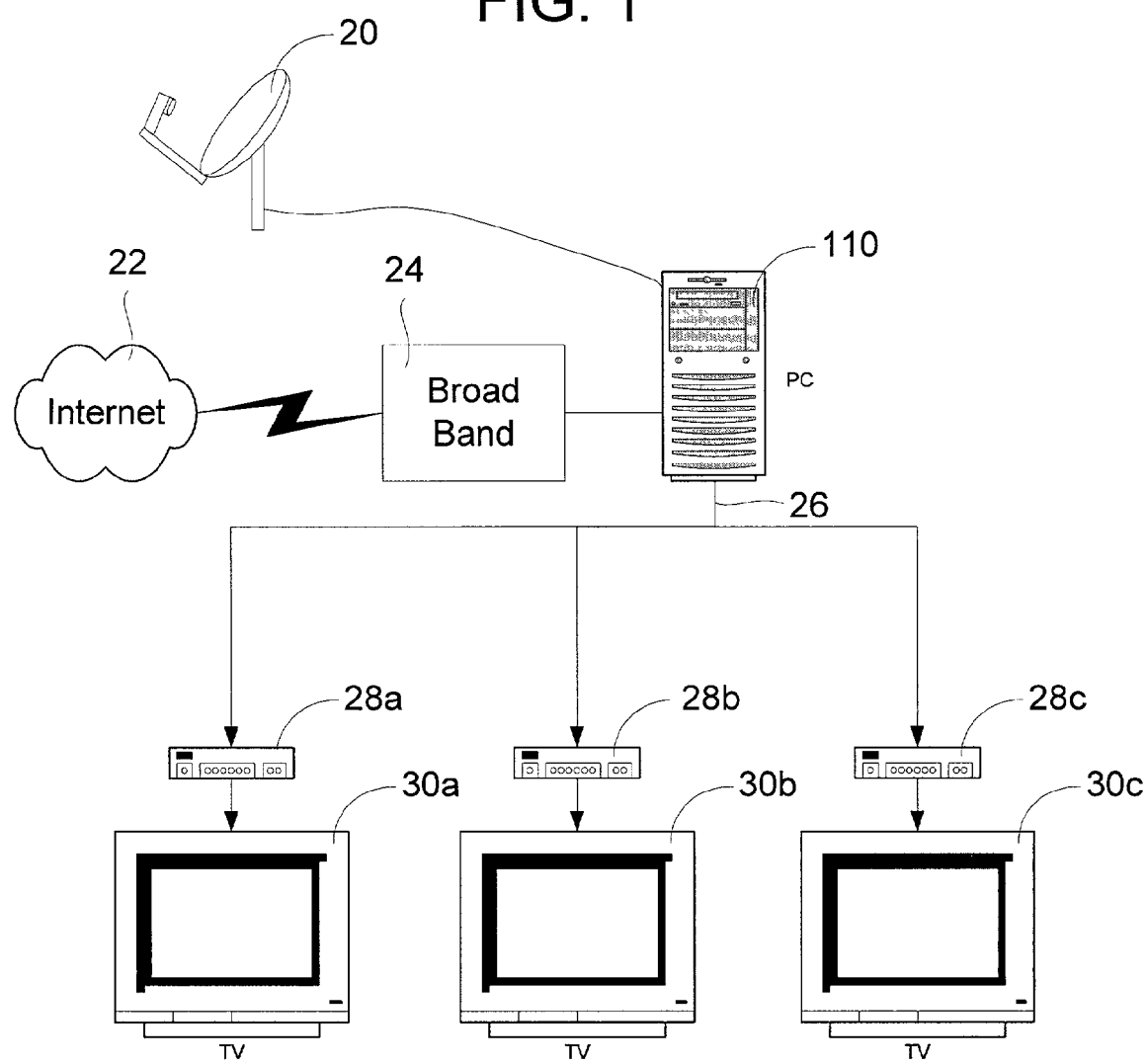
FIG. 1 is a simplified network diagram illustrating an exemplary environment in which the system and methods of the present invention may be practiced.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including handheld devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable operating environment 100 in which the invention may be implemented as illustrated. The operating environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, the exemplary computing environment 100 in which the system and methods of the present invention find particular applicability is a computing environment providing audio/video (A/V) distribution from a network server, such as computer 110. This A/V content may be stored on the computer 100, or may be provided, in the case of premium video content, via a broadcast media illustrated in FIG. 1 as being received by a digital satellite dish 20. Additionally or alternatively the A/V content may be provided from a server connected through the Internet 22 via a broadband connection 24, for example DSL, cable, etc. In any event, whether the A/V content is streamed to the computer 110 or stored or played thereon, it will preferably be distributed via a video capable network 26 to a number of consumer computing devices, such as the devices designated A/V node 28a-c. These A/V nodes 28a-c will then individually render the A/V content to a display device, such as television 30a-c. The selection of the desired A/V content may be provided by a simple remote control device (not shown). In response to the appropriate inputs, the A/V node device 28 will query the network server (computer 110) to retrieve the library of A/V content stored thereon and the available A/V content that may be streamed thereto.

In such an operating environment as illustrated in FIG. 1, the consumer devices 28a-c must satisfy at least two criteria for acceptance in the marketplace. The first relates to the problem discussed above with regard to the cost of the Flash memory typically required to store the operating system of the computing device. To overcome this problem, as will be discussed more fully below, the operating system is not stored in the device 28, but is instead downloaded from the network server 110 upon boot of the device 28. In this way, the amount of flash memory required may be reduced to an amount sufficient to merely hold a small secure boot program. In one embodiment, approximately one-half megabyte of Flash memory (approximately 512 k) is all that is needed.

The second criteria relates to the digital rights management of the A/V content and operating system which will be downloaded to the device 28 from the network server 110. To satisfy this criteria, as will be discussed more fully below, both hardware and software security policies or features are incorporated in the device 28. Briefly, the hardware techniques include on-board manufacturing that embeds the circuit connections between the CPU and the memory within the multi-layer circuit board structure of the device. The software security polices or methods include the use of digital signatures that must be verified before a program is allowed to execute.

Figure 2:
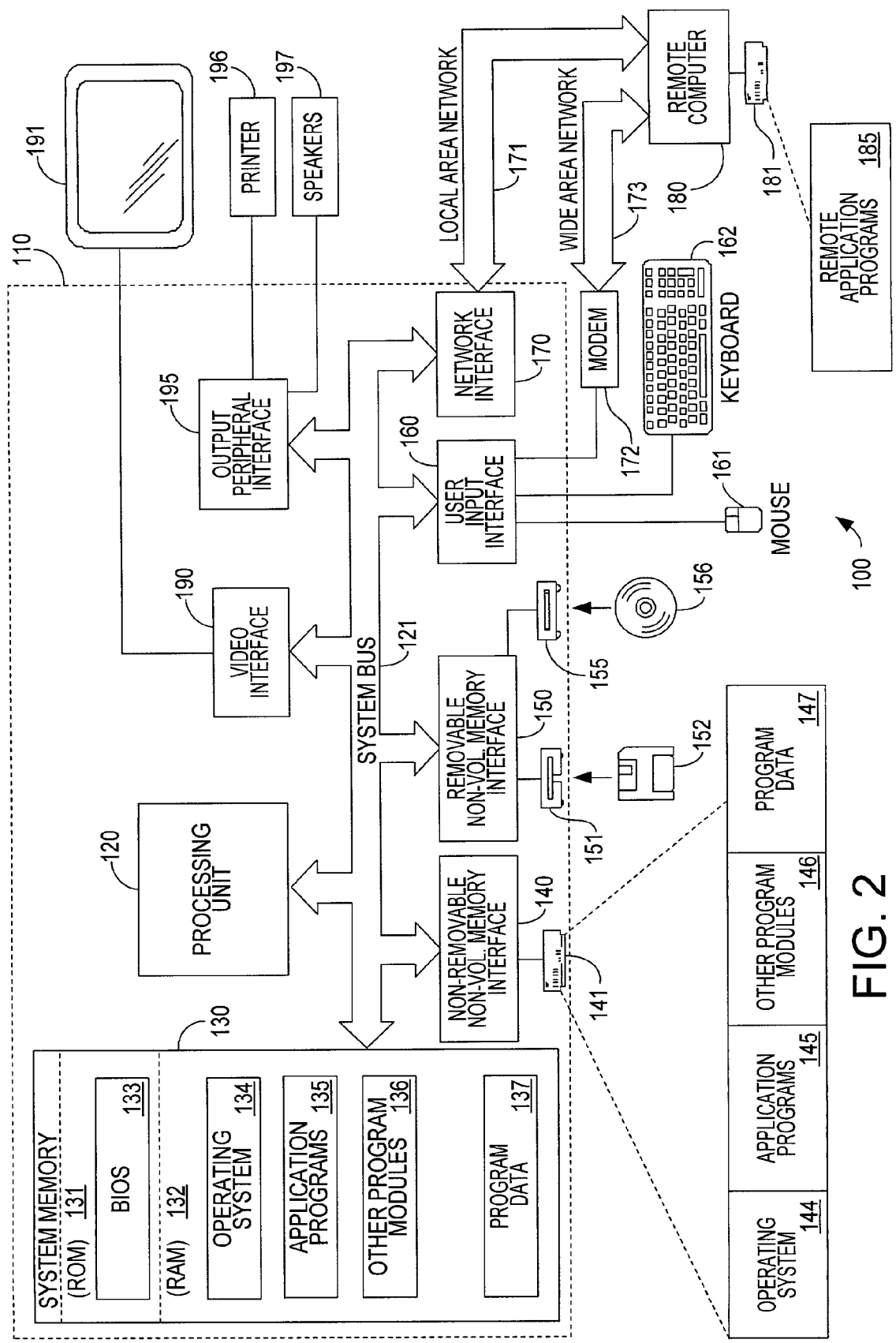
FIG. 2 is a block diagram generally illustrating an exemplary computer system, such as a personal computer serving as a network server in the environment illustrated in FIG. 1.

With reference to FIG. 2, components of the computer 110 will be generally described to provide a greater understanding of its interaction with the system and method of the present invention, although such description should not be taken as limiting the scope of the invention. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 3:
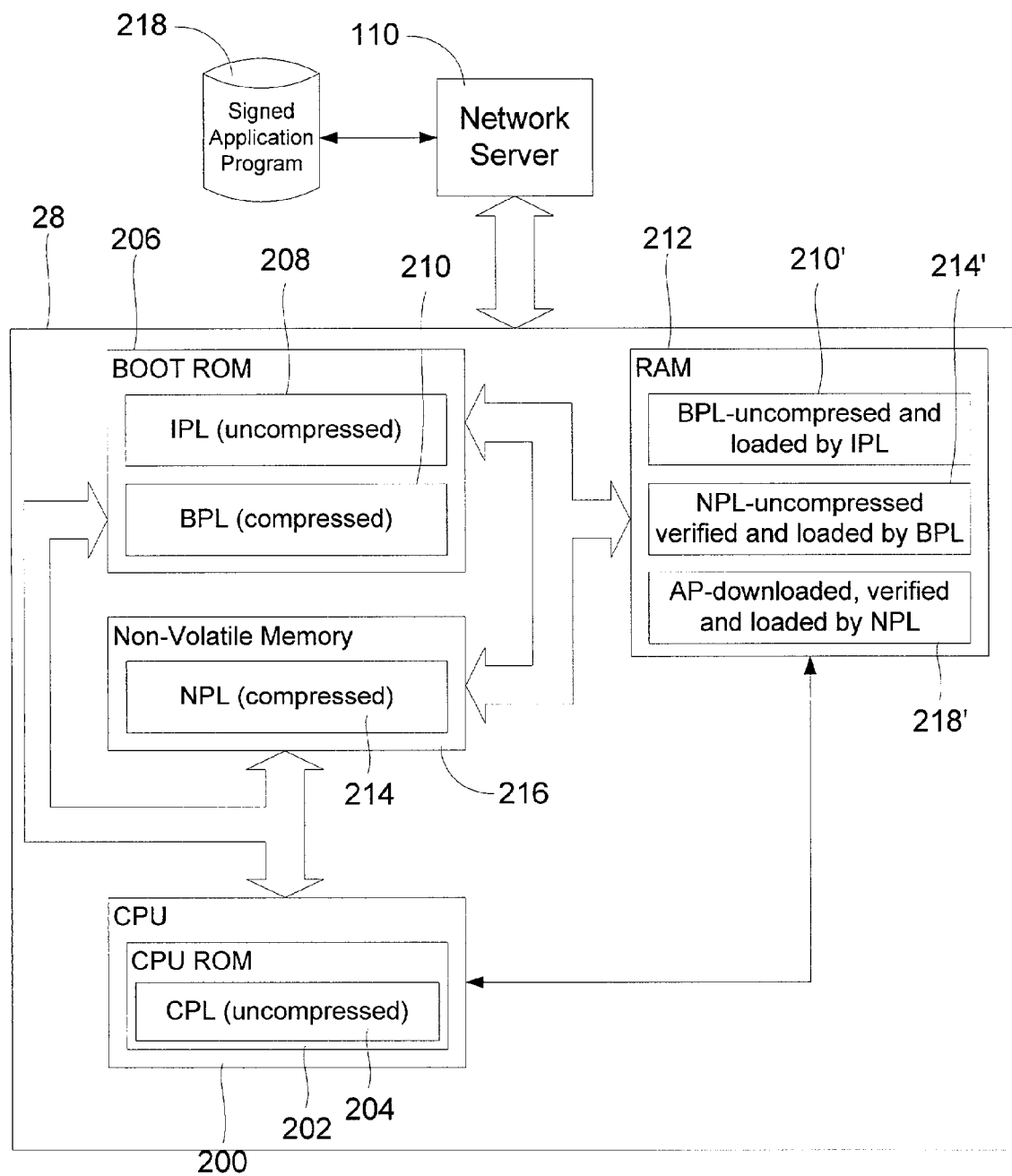
FIG. 3 is a simplified block diagram generally illustrating the memory and processing components of a consumer computing device constructed in accordance with the teachings of the present invention.

With reference to FIG. 3, components of the device 28 will now be generally described to provide a greater understanding of their interaction with the system and methods of the present invention. Specifically, the embodiment of the present invention illustrated in FIG. 3 utilizes a central processing unit (CPU) 200 that includes read-only memory (CPU ROM) 202 therein. In one embodiment, 8 k of CPU ROM is provided. The CPU ROM 202 is utilized to store a CPU program loader (CPL) 204 that will be executed upon initial boot of the device 28. Since the CPU ROM 202 is internal to the CPU 200, it cannot be accessed or changed by a hacker or other mischievous entity. As such, it provides a first level of security for the device 28. The CPL 204 contains the first instructions that run on the CPU 200 at power up. They cannot be altered. The operation and functionality of the CPL 204 will be discussed more fully below with regard to FIG. 6.

The Boot ROM 206 contains two programs, the initial program loader (IPL) 208 and the boot program loader (BPL) 210. The IPL 208 is the initial bootstrap program, and is uncompressed and unencrypted. The operation of the IPL 208 will be discussed more fully below with regard to FIG. 7. Basically, the IPL 208 performs elementary tests on the system and uncompresses the BPL 210 into RAM 212 (the uncompressed BPL is indicated as reference numeral 210'). The BPL 210' uncompresses, validates, and copies to RAM 212 a network program loader (NPL) 214'.

This NPL 214 resides in a writable area of persistent storage, illustrated as non-volatile memory 216. A more detailed discussion of the operation of the BPL 210 is included below with reference to FIG. 8. Once the NPL 214' is uncompressed, verified, and loaded into RAM 212, its fundamental task is to locate, download to RAM 212, validate, and execute a signed application program to 18. The NPL 214 is upgradable in the field from the network server 110 by the application program 218'.

Figure 4:
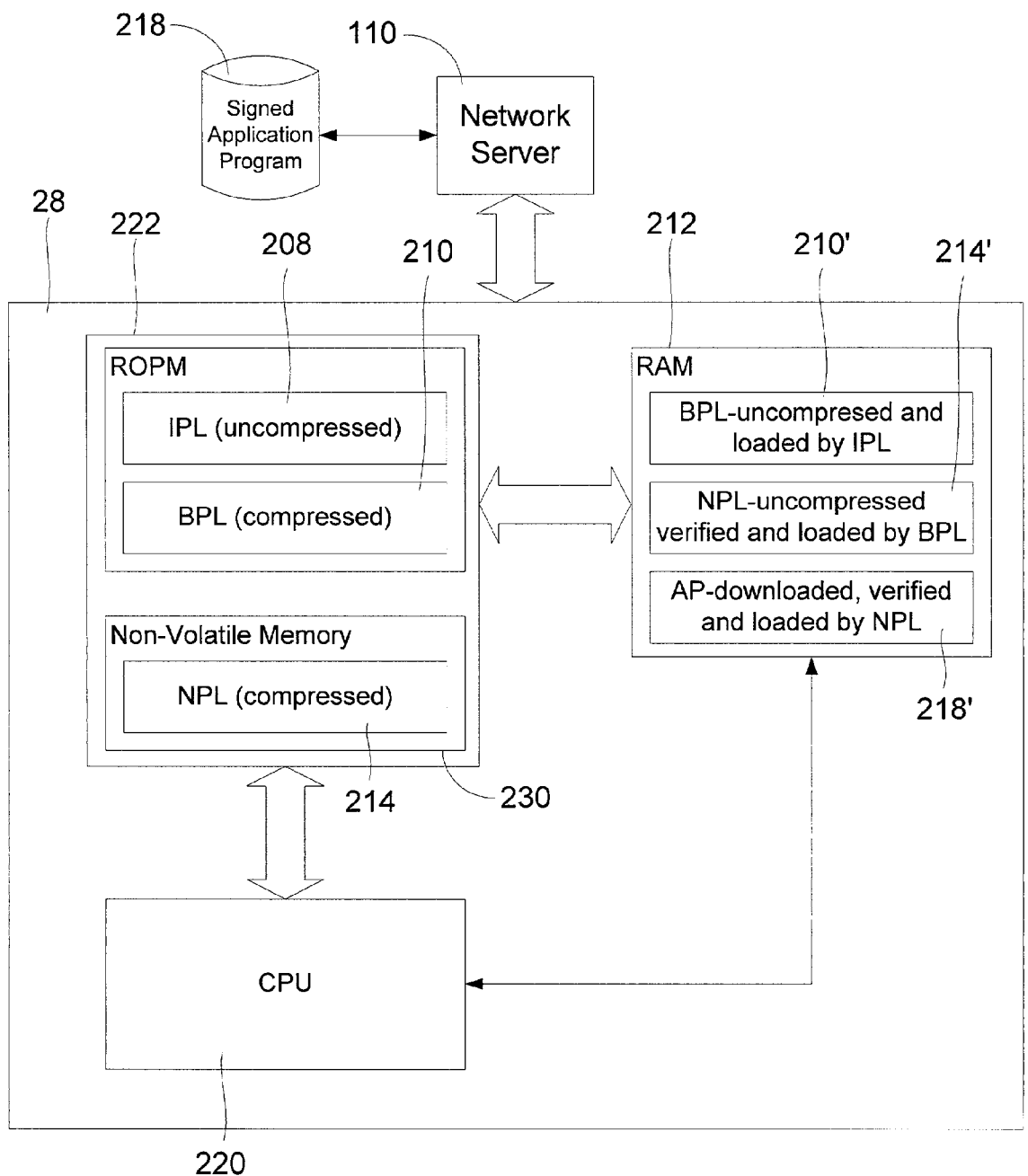
FIG. 4 is a block diagram generally illustrating the memory and computing components of an alternate embodiment of a consumer computing device constructed in accordance with the teachings of the present invention.

An alternate embodiment of the device 28 of the present invention is illustrated in FIG. 4. In this embodiment of the device 28, the central processing unit (CPU) 220 does not include onboard read-only memory, and therefore cannot include a CPL as discussed above with regard to the embodiment of FIG. 3. In this embodiment, the IPL 208 and the BPL 210 are stored in a read-only protected memory (ROPM) section 222 of Flash memory 224. This ROPM 222 is an unwritable section of Flash memory 224.

Figure 5:
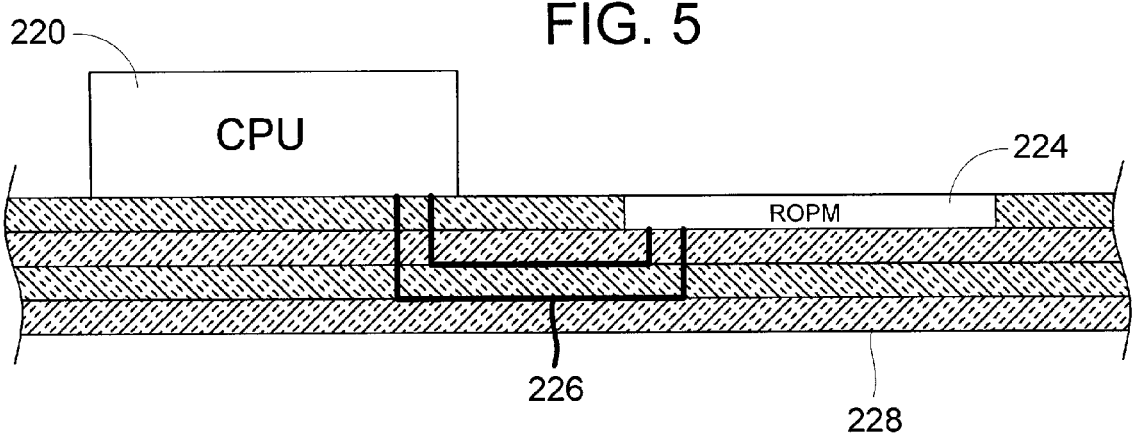
FIG. 5 is a simplified cross-sectional cut away illustration of a multi-layer circuit board utilizing chip-on-dash board manufacturing techniques to secure the read only protected memory and its connections to a central processing unit employed in an embodiment of the present invention.

To provide additional security, the Flash memory 224 will be mounted on-board utilizing known manufacturing techniques that will embed all connections 226 within the multilayer circuit board 228 of the device as illustrated in FIG. 5. The use of this on-board mounted Flash manufacturing process will ensure the integrity of the Flash memory 224, including its ROPM section 222 (See FIG. 4) in which the IPL 208 and BPL 210 are stored. Preferably, the CPU 220 uses ball grid array packaging while the Flash memory 224 uses chip-on-board packaging embedded into sub-layers of the circuit board 228. In this way, no routings/interconnects 226 between the memory 224 and the CPU 220 are exposed to hackers or malicious entities.

Returning briefly now to FIG. 4, the Flash memory 224 also includes a writable section 230 of non-volatile memory in which the NPL 214 is stored. As with the previous embodiment, this NPL program may be updated by the application program 218' as required.

Figure 6:
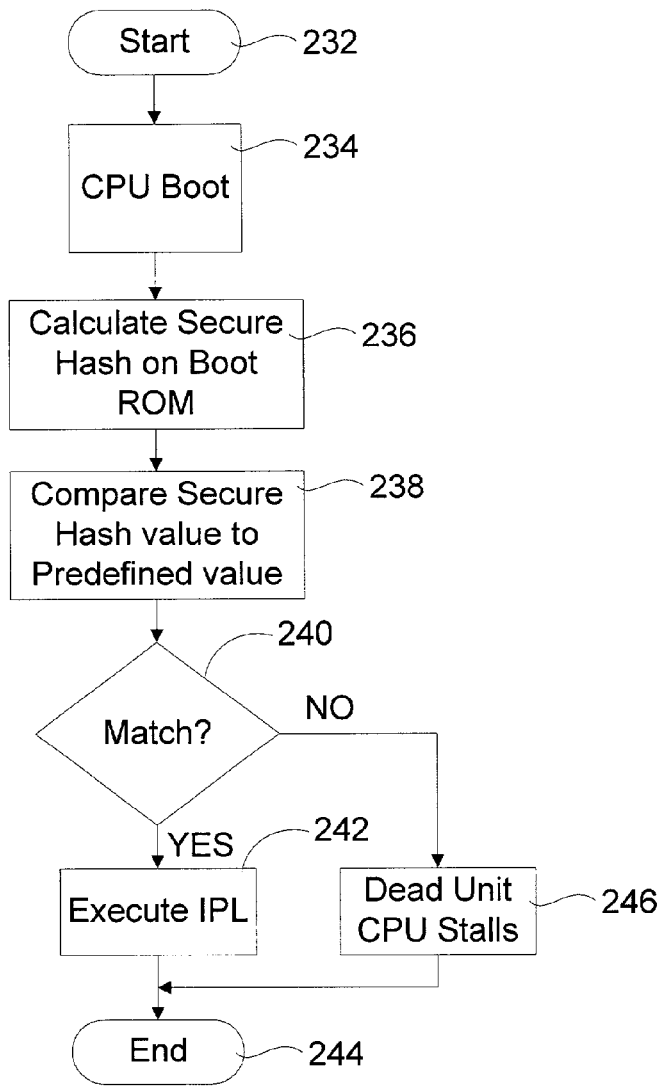
FIG. 6 is a simplified flow diagram of a component of the present invention.

Referring now to FIG. 6, operation of the CPL 204 that resides in CPU ROM 202 in those embodiments that include such a CPU 200 will now be discussed. Once the device 28 is turned on 232, the CPU is booted 234. The CPL then calculates a secure hash on the boot ROM at step 236. It should be noted that while the embodiment of FIG. 3 illustrates the usage of a boot ROM 206 and separate non-volatile memory 216, Flash memory 224 as utilized in the embodiment illustrated in FIG. 4 may also be used. In which case, step 236 calculates a secure hash on the ROPM 222. This secure hash value is then compared to a pre-defined value that is burned into the CPU ROM 202 at step 238. Since this memory is write-protected, this signature check also checks, in essence, the integrity of the IPL 208 and BPL 210.

At step 240, if the secure hash value matches the hard coded value in the CPU ROM 202, then it is assumed that there has been no tampering of the device at this level and the CPL 204 executes the IPL 208 at step 242 before the CPL process ends 244. However, if step 240 determines that the calculated secure hash does not match the hard-coded value in the CPU ROM 202 the CPL 204 assumes that there is either a problem with the unit or that tampering has occurred. As such, the unit is assumed to be dead and the CPU stalls 246 before the process is ended 244.

Figure 7:
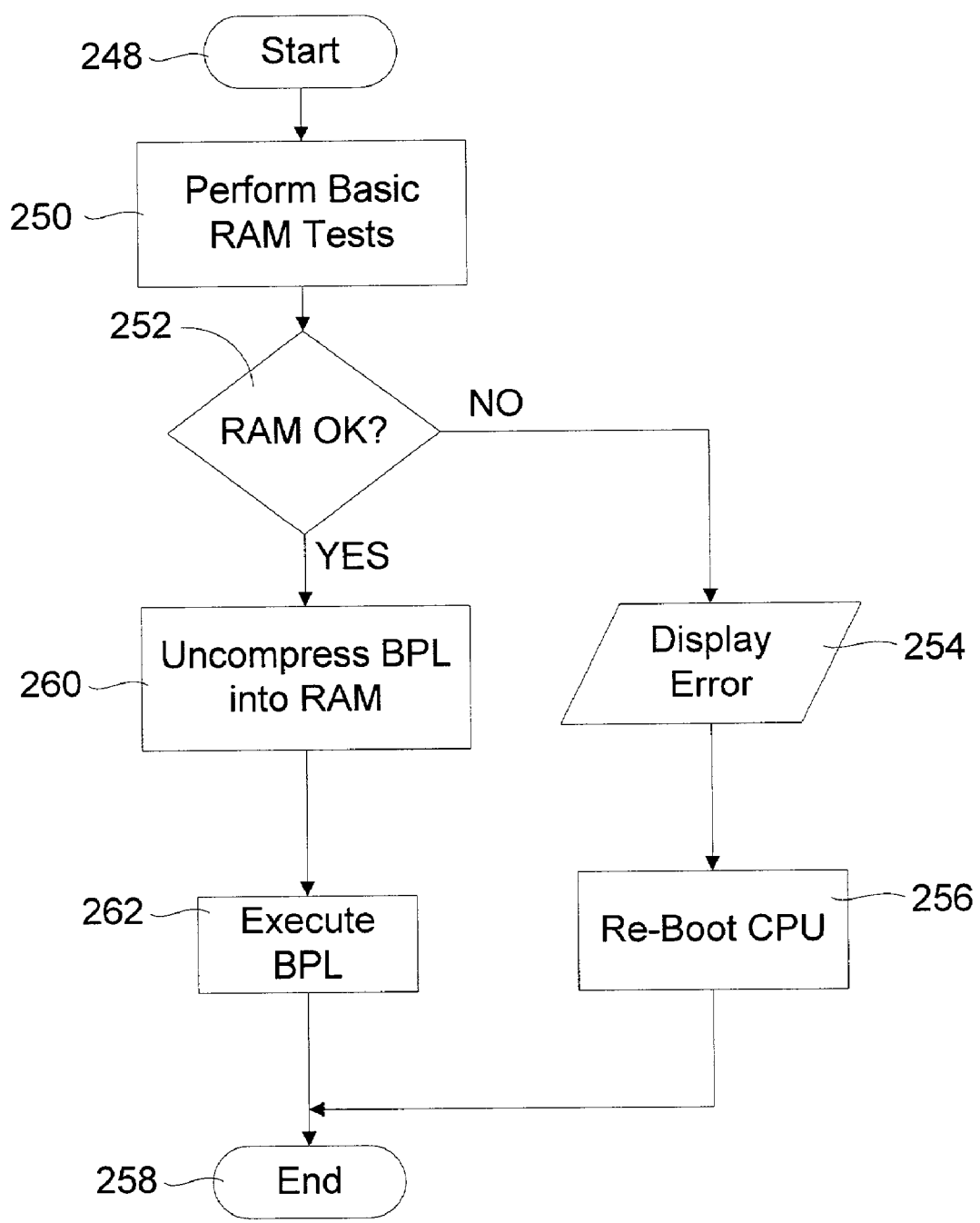
FIG. 7 is a simplified flow diagram of an additional component of the system and method of the present invention.

The execution of the IPL 208 will take place either after verification of the signature of the boot ROM by the CPL 204 in those embodiments that include a CPU 200 having CPU ROM 202 and a CPL 204, and initially upon power up in those embodiments whose CPU 220 does not include CPU ROM, and therefore no CPL. Once initiated 248 as illustrated in FIG. 7, the IPL 208 performs basic memory tests at step 250. If any errors are detected during these basic memory tests at step 252, the errors are displayed at step 254 to the user. The IPL will then attempt to reboot the CPU at step 256 before ending 258. If the memory checks all pass at step 252, the IPL then uncompresses the BPL and loads it into RAM for execution at step 260. Once loaded into RAM, the IPL then executes the BPL at step 262 before ending 258. Since both the IPL and BPL have either already been verified thought the signature check performed by the CPL, or are assumed to be valid when the on-board manufacturing is utilized and the IPL and BPL are stored in the ROPM 222, the IPL need not perform a digital signature check on the BPL.

Figure 8:
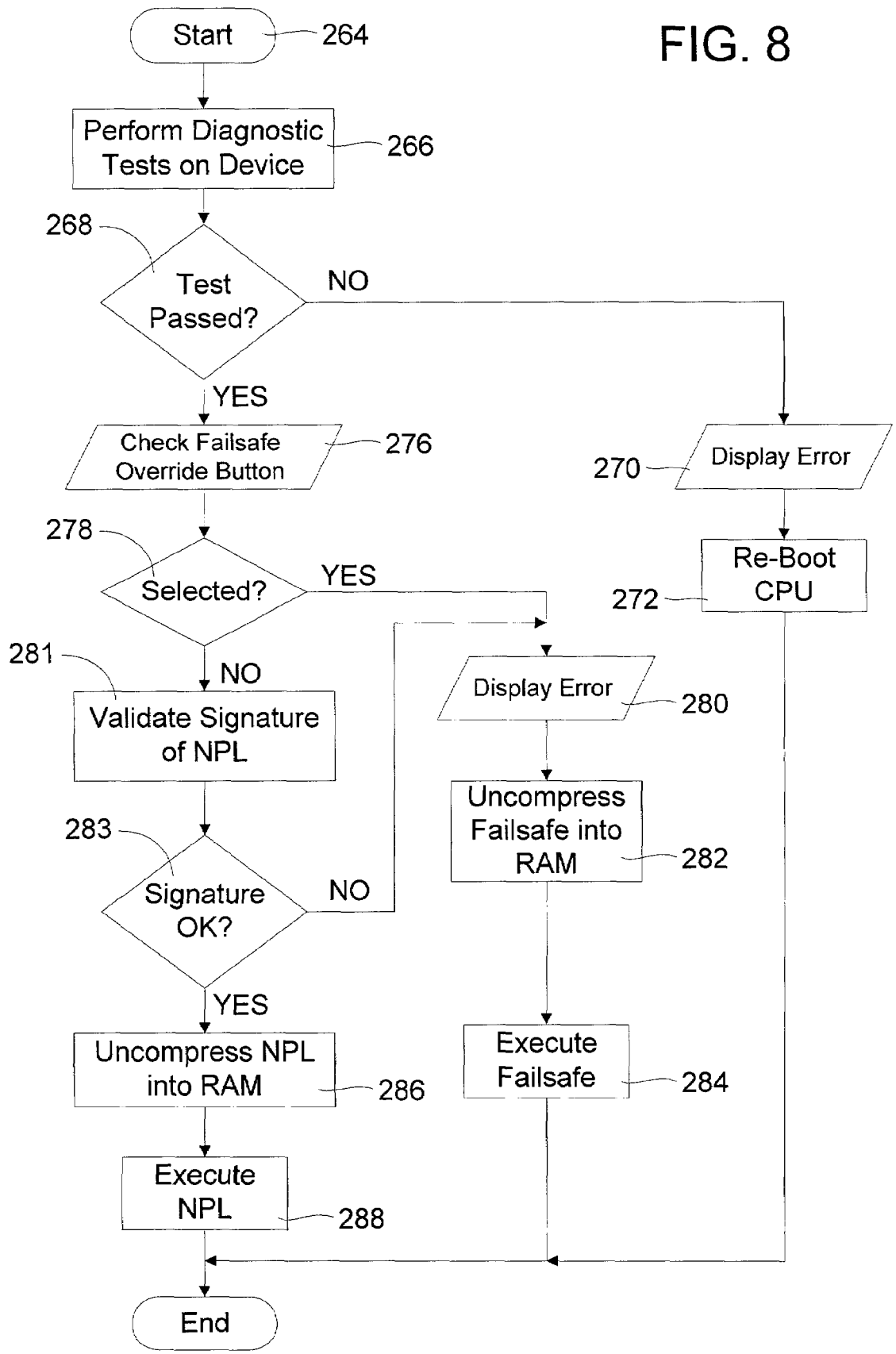
FIG. 8 is a simplified flow diagram of a further component of the system and method of the present invention.

As illustrated in FIG. 8, once the IPL has uncompressed and loaded the BPL into RAM, its execution is begun at step 264. The BPL performs additional diagnostic tests on the device at step 266. If, at step 268, any errors are detected, they are displayed for the user at step 270. The BPL then reboots the CPU at step 272 before ending 274. If, however, all tests are passed at step 268, the BPL next checks a fail safe override button at step 276 to see if it is selected by the user. If it is selected at step 278, then the BPL will display the appropriate message to the user at step 280, will uncompress and load a fail-safe program into RAM at step 282 and will then execute the fail-safe program at step 284 before ending 274.

In an embodiment of the present invention that does not provide a fail-safe override button or a fail-safe program, the steps are omitted. If such a button is not selected at 278 or if such is not provided in the embodiment of the invention, the BPL then validates the signature of the NPL at step 281. This signature validation is provided since the NPL is in a writable section of memory to ensure that it is a trusted program that has not been modified by a hacker or other malicious entity. If this signature check fails at step 283 an error is displayed for the user at step 280. A fail-safe program is then uncompressed and loaded in RAM at step 282 and executed at step 284 before the BPL ends 274. In embodiments of the present invention that do not include a fail-safe program, a failure of the signature check at step 282 will result in an error being displayed (such as at step 270) before the CPU is rebooted (such as at step 272). However, if the signature check passes at step 283, then the BPL uncompresses the NPL and loads it into RAM at step 286. The BPL then executes the NPL at step 288 before ending 274.

Figure 9:
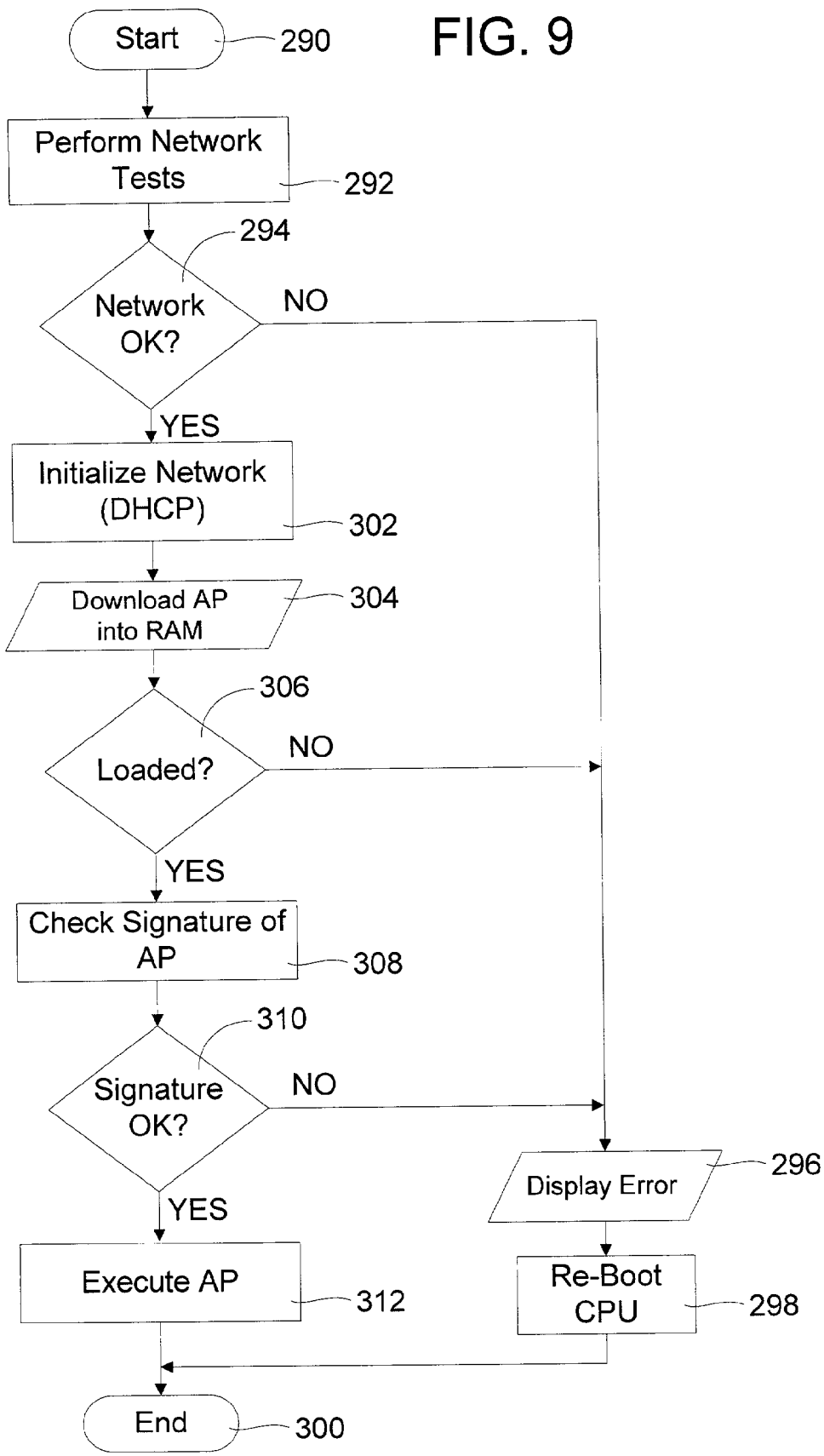
FIG. 9 is a simplified flow diagram of still another component of the system and method of the present invention.

Once execution of the NPL has begun at step 290 of FIG. 9, it performs additional diagnostic tests (e.g. network tests) on the device at step 292. If an error is detected on the network at step 294, an error is displayed for the user at step 296 before the CPU is rebooted at step 298 and the NPL process ends 300. However, if the network checks out okay at step 294, the NPL will then initialize the network via DHCP at step 302.

The NPL will then download the signed application program (the device operating system) into RAM at step 304. If a problem occurs with the loading of the application program at step 306, an error will be displayed for the user at step 296 before the CPU is rebooted at step 298 and the process ends 300. If, however, the application program loads successfully at 306, then the NPL will verify its signature at step 308. If the signature check fails at step 310, an error is displayed to the user at step 296 before the CPU is rebooted at step 298 and the process ends 300. However, if the signature verification is complete 310, then the NPL will execute the application program at step 312 before ending 300.

Figure 10:
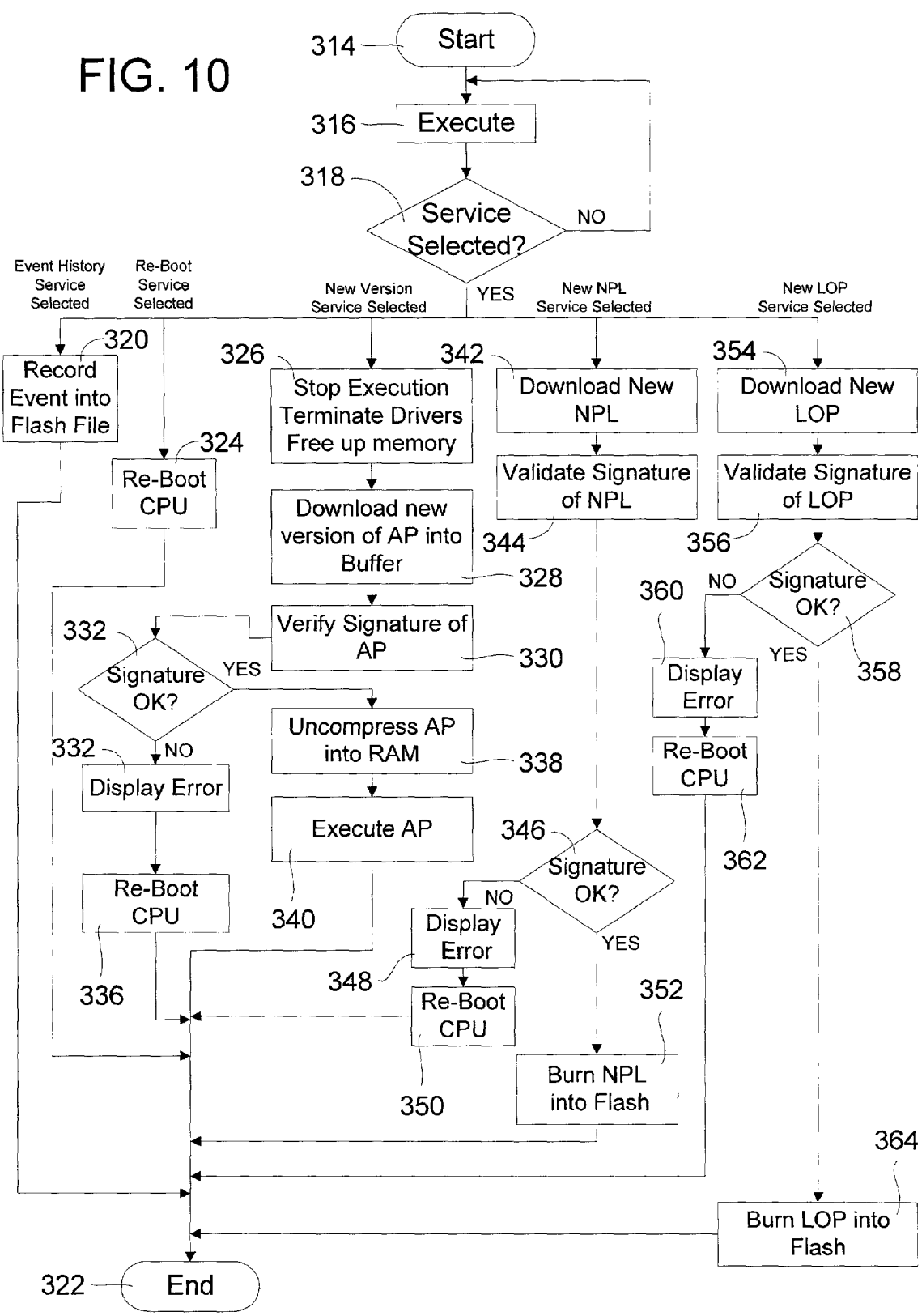
FIG. 10 is a simplified illustration of still yet another component of the system and method of the present invention.

While the full scope of the application program is beyond the scope of the present application, it will preferably provide certain services as will be discussed with reference to FIG. 10. Initially 314 the application program is executed 316 by the NPL, and performs its functions, for example providing the selection and rendering of A/V content when embodied in a device 28 in an operating environment 100 that provides such A/V content from a network server 110 (see, for example, FIG. 1). At some point during the application programs execution, a user may select one of the services provided at step 318. If the user selects the event history service at step 318, the application program would record events into a Flash file at step 320 that may be collected by the network server 110 before this service completes at step 322. If the user selects the reboot service at step 318, the application program will reboot the CPU at step 324 before completing 322. If the user selects the new version service at step 318, the application program will stop execution of all A/V activity, terminate all A/V drivers, and free up their memory at step 326. A new version of the application program will then be downloaded into that buffer memory at step 328 and its signature will be checked at step 330. If the signature cannot be validated at step 332, an error will be displayed at step 334, and the CPU will be rebooted at step 336 before the service completes 322. However, if the signature is verified at step 332, the newly downloaded application program will be uncompressed and loaded into RAM at step 338 and then executed at step 340 before the service ends 322.

If the user selects the new NPL service at step 318, the application program will then download a new version of the NPL at step 342. The signature of the NPL download will then be validated at step 344. If the signature cannot be validated at step 346, an error will be displayed at step 348 and the CPU rebooted at step 350 before this service ends 322. However, if the signature of the downloaded NPL is verified at step 346, then that new version of the NPL will be will burned into the Flash memory at step 352, before the service ends 322.

An embodiment of the present invention may also include a local only program (LOP) that is also stored in the non-volatile memory along with the NPL and that provides operation of the device 28 in the event the network is not operational. In such embodiments, if the user selects the new LOP service at step 318, the application program will download a new version of the LOP at step 354. The application program will then validate the signature of the LOP download at step 356. If, at step 358, the signature cannot be validated, an error is displayed at step 360 and the CPU is rebooted at step 362 before this service ends 322. If, however, the signature is validated at step 358, then the new version of the LOP is burned into Flash memory at step 364 before this service ends 322. This LOP can provide limited A/V functionality even when the network is down and the application program cannot be loaded. In embodiments that include such a local only program, it is executed by the NPL if the network is sensed as being failed at step 294 of FIG. 9. This LOP is responsible for periodically checking the network, and for re-executing the NPL upon finding the network functional.

As discussed above, the system and methods of the present invention are utilized to securely load an application program from a network server. This is preferably accomplished with DHCP and BOOTP (TFTP). DHCP is used to acquire an IP address. Some device in the operating environment, such as the computer 110 or a broadband gateway 24, etc., is expected to be the DHCP server. BOOTP is used to download a program. It is very simple and achieves a load rate on Ethernet of 4 MBS using 600 byte packets. A preferred embodiment the system and methods of the present invention change this requirement to use 1,100 byte packets and send an acknowledgement every fourth packet. Each of these protocols are standards and are well documented and known in the art, and therefore further discussion thereof is not included in the interests of brevity.

As is now apparent to those skilled in the art from the foregoing description, the sequence of execution of the various programs and methods of the present invention without any errors being detected provides execution of the CPL in the CPU when present. The CPU validates the secure hash of the protected Flash memory, and therefore inherently of those programs stored therein. The CPL then executes the IPL in the protected Flash memory. This IPL executes in the Flash memory and extracts to RAM and executes the BPL. The BPL then validates, extracts to RAM and executes the NPL. The NPL locates, downloads to RAM, validates, and executes the application program. This application program, in the operating environment illustrated in FIG. 1, validates, streams, and displays A/V content, e.g. a movie.

In the event of a corrupted NPL, the sequence is somewhat modified. Specifically, the IPL executes in Flash and extracts to RAM and executes the BPL. The BPL will fail to validate the NPL due to the corruption. The BPL will then extract to RAM and execute the fail-safe program if provided, otherwise it will display an error and reboot the CPU. In embodiments of the present invention in which a fail-safe program is provided, it will fetch a new NPL from the network server, burn it to Flash memory, and reboot the CPU.

In the event of a non-functioning network, the sequence of operation discussed above is also somewhat modified from that in a healthy system. Specifically, the IPL will execute in Flash memory, and will extract to RAM and execute the BPL. The BPL will then validate, extract to RAM and execute the NPL. However, the NPL will fail to validate the network, and will then display an error message and reboot the CPU. In embodiments of the present invention which provide a local only program, LOP will then execute to provide limited A/V functionality without the network. The LOP will also periodically check for network availability. If the network is sensed to have become available, LOP will then re-execute the NPL.

Security of the operation of the devices of the present invention are provided at various levels. The actual A/V content streamed to the device for rendering on television is protected by digital rights management technology, such as Microsoft Digital Rights Management (MSDRM). This DRM is implemented by the application program. This application program in turn is protected by its digital signature which is checked by the NPL. The NPL is also protected by a digital signature which is checked by the BPL. The BPL and IPL are protected by being stored in non-rewritable memory. In embodiments that include CPU ROM, the CPL also provides protection for the IPL and BPL by checking the secure hash of the memory in which they are stored. In environments that do not include a CPL, the non-rewritable memory is protected by being board mounted using on-board manufacturing techniques that embed all circuit connections within a multi-layer circuit board structure.

Through these mechanisms the system and methods of the present invention provide strategic security that allows the secure operation of the device of the present invention in an economical and secure fashion that satisfies the demands of the A/V content providers. Specifically, proprietary algorithms for A/V codecs will be resident in the device of the present invention. By implementing the dynamic, volatile solution of the present invention, the risk of hackers and illegal copies of the ROM to be proliferated is greatly reduced. By keeping the run time image encrypted and secure until it is decrypted at run time also reduces the chances of it being copies.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of booting a consumer computing device having non-rewritable memory, writable non-volatile memory, and random access memory (RAM) via a network server, comprising the steps of:

executing an initial program loader (IPL) stored in the non-rewritable memory within the device, the IPL decompressing a boot program loader (BPL) from the non-rewritable memory and storing the decompressed BPL in RAM;

executing the BPL, the BPL validating a first signature of a network program loader (NPL) stored in the writable non-volatile memory, the BPL further decompressing the NPL when the first signature can be validated and storing the decompressed NPL in RAM;

executing the NPL to initialize a network connection from the device to the network server, the NPL further downloading a run time image of an abbreviated operating system from the network server, the NPL validating a second signature of the abbreviated operating system; and executing the abbreviated operating system when the second signature can be validated.

2. The method of claim 1 wherein the device includes a central processing unit (CPU) having read only memory (CPU ROM) provided therein, further comprising the step of executing a central processing unit program loader (CPL) stored in the CPU ROM prior to the step of executing the IPL, the CPL calculating a secure hash of the non-rewritable memory and comparing the secure hash to a hard coded value stored in the CPU ROM, the CPL executing the IPL when the secure hash matches the hard coded value and stalling operation of the device when the secure hash does not match the hard coded value.

3. The method of claim 1, wherein the IPL further performs basic memory tests prior to the step of decompressing the BPL, the IPL displaying an error and re-booting the device upon detecting a memory error.

4. The method of claim 1, wherein the BPL further performs diagnostic tests on the device prior to the step of validating the signature of the NPL, the BPL displaying an error and re-booting the device upon failure of one of said diagnostic tests.

5. The method of claim 4, wherein the BPL further checks a failsafe override input, and wherein the BPL uncompresses a failsafe program stored in the writable non-volatile memory into RAM, the BPL further executing the failsafe program.

6. The method of claim 5, wherein the failsafe program retrieves a new NPL from the network server, stores the new NPL in the writable non-volatile memory, and reboots the device.

7. The method of claim 1, wherein the BPL uncompresses a failsafe program stored in the writable non-volatile memory into RAM when the first signature cannot be validated, the BPL further executing the failsafe program.

8. The method of claim 7, wherein the failsafe program retrieves a new NPL from the network server, stores the new NPL in the writable non-volatile memory, and reboots the device.

9. The method of claim 1, wherein the NPL further performs network tests to determine the status of the network, the NPL displaying an error and rebooting the device when a network test fails.

10. The method of claim 1, wherein the operating system provides a plurality of services, and wherein the operating system records an event file to the writable non-volatile memory upon user selection of an event history service.

11. The method of claim 1, wherein the operating system provides a plurality of services, and wherein the operating system reboots the device upon user selection of a reboot service.

12. The method of claim 1, wherein the operating system provides a plurality of services, and wherein the operating system downloads a new version of the operating system into a buffer, validates a third signature of the new version of the operating system, uncompresses the new version of the operating system into RAM, and executes the new version of the operating system upon user selection of a new version service.

13. The method of claim 12, wherein the operating system displays an error and reboots the device when the third signature cannot be validated.

14. The method of claim 1, wherein the operating system provides a plurality of services, and wherein the operating system downloads a new version of the NPL, validates a fourth signature of the new version of the NPL, and burns the new version of the NPL into the writable non-volatile memory when the fourth signature is validated upon user selection of a new NPL service.

15. The method of claim 14, wherein the operating system displays an error and reboots the device when the fourth signature cannot be validated.

16. The method of claim 1, wherein the operating system provides a plurality of services, and wherein the operating system downloading a new version of a local only program (LOP), validating a fifth signature of the new version of the LOP, and burns the LOP into the writable non-volatile memory when the fifth signature is validated upon selection of a new LOP service.

17. The method of claim 14, wherein the operating system displays an error and reboots the device when the fifth signature cannot be validated.

18. A computer-readable medium having stored thereon computer-executable instructions for performing the steps of claim 1.

* * * * *

UNITED STATES PATENT AND TRADEMARK OFFICE
CERTIFICATE OF CORRECTION

| | | |
|---|---|---|
| PATENT NO. | : 7,558,958 B2 | Page 1 of 1 |
| APPLICATION NO. | : 10/170975 | |
| DATED | : July 7, 2009 | |
| INVENTOR(S) | : Bruce L. Lieberman et al. | |

It is certified that error appears in the above-identified patent and that said Letters Patent is hereby corrected as shown below:

In column 16, line 26, in Claim 16, delete "bums" and insert -- burns --, therefor.

Signed and Sealed this
Third Day of May, 2011

David J. Kappos
*Director of the United States Patent and Trademark Office*